United States Patent [19]

Petersen et al.

[11] Patent Number: 4,575,321
[45] Date of Patent: Mar. 11, 1986

[54] HYDROSTATIC CONTROL DEVICE, PARTICULARLY STEERING DEVICE

[75] Inventors: Hans C. Petersen, Nordborg; Erik Kyster, Augustenborg; Svend E. Thomsen, Nordborg, all of Denmark

[73] Assignee: Danfoss A/S, Nordborg, Denmark

[21] Appl. No.: 756,659

[22] Filed: Jul. 19, 1985

Related U.S. Application Data

[62] Division of Ser. No. 550,256, Nov. 10, 1983.

[51] Int. Cl.$^4$ .................. F04C 2/10; F16D 31/02
[52] U.S. Cl. .................. 418/61 B; 60/384; 137/625.21
[58] Field of Search .............. 418/61 B, 75, 80; 60/381; 251/283; 137/625.21

[56] References Cited

U.S. PATENT DOCUMENTS

| | | | |
|---|---|---|---|
| 3,568,448 | 4/1972 | Woodling | 418/61 B |
| 3,597,128 | 8/1971 | Venable | 418/61 B |
| 4,232,708 | 11/1980 | Miller | 91/467 X |
| 4,411,607 | 10/1983 | Wisthof et al. | 418/75 X |
| 4,439,119 | 3/1984 | Petersen et al. | 418/75 X |

Primary Examiner—John J. Vrablik
Assistant Examiner—Theodore Olds
Attorney, Agent, or Firm—Wayne B. Easton

[57] ABSTRACT

The invention relates to a hydrostatic steering control device of the type having two motor ports connectable to a servomotor and a metering unit for metering the flow of fluid to or from the servomotor in accordance with the rotational movement of a steering wheel for operating the control device. The invention is directed to a way of balancing the distributing valve of the control device by subjecting opposite sides thereof to high and intermediate pressure zones and providing a throttle gap between the high and intermediate pressure zones and a second oppositely acting throttle gap between the intermediate pressure zone and a third zone of lower pressure.

2 Claims, 6 Drawing Figures

HYDROSTATIC CONTROL DEVICE, PARTICULARLY STEERING DEVICE

This application is a division of application Ser. No. 550,256 filed Nov. 10, 1983.

The invention relates to a hydrostatic control device, particularly steering device, comprising a metering motor and a flat slide directional valve which, in response to actuation of a control shaft and rotation of the metering motor, assumes a neutral position or one of two operating positions in which pressure fluid passes through an operating motor and the metering motor in series, at least the valve element having the primarily moved slide surface being mounted for rotation between the other slide surface and a wall parallel thereto.

In a known control device of this kind (DE-PS No. 16 53 822) two valve plates and a gear of the metering motor surrounded by a gear ring are arranged between two end walls of an outer housing. The first valve plate is fixed to turn with a control shaft. Together with the second valve plate it forms a flat slide directional valve. Together with the gear ring, the second valve plate forms a distributing valve. The directional valve, which is normally in its neutral position is brought to one of two operating positions by turning the control shaft, so that pressure fluid is led through the metering motor to a steering operating motor. At the same time, the metering motor causes the second valve plate to follow the first valve plate. Both valve plates comprise through going apertures so that openings are provided on both sides for entering or leaving pressure fluid.

In practice, it has been found that control devices of this kind are well suited for steering heavy and slow vehicles and corresponding applications because they amplify the actuating force of the operator. If, however, faster vehicles are to be steered in this way or similar controls are to be carried out, difficulties are encountered, most frequently an over control.

A radial piston machine is also known (DE-AS No. 25 44 849) which has a multi-way distributing valve, wherein blind bores provided in a rotatable annular plate connect control orifices, which lie on a circle and are connected to the redial cylinders to control orifices which are disposed therebetween and are connected alternately to the supply side and the discharge side. On the operating side of the annular plate, a high pressure zone in the form of an annular groove adjoins a first throttle gap which extends up to the periphery of the annular plate. The opposite side of the annular plate which is thus connected thereto serves as an intermediate pressure zone. The latter is associated with a second throttle gap which leads to the low pressure side and is disposed in the same plane as the first throttle gap but changes in the opposite sense upon axial displacement of the annular plate. In this way, one achieves a balancing of pressures which prevents abutment of the relatively rotatable parts. The invention is based on the problem of providing a hydrostatic control device of the aforementioned kind in which over control can be avoided. In particular, a steering device built up in this manner is also to be suitable for faster vehicles.

This problem is solved according to the invention in that the valve element comprises, on that side where openings are provided for the supply and withdrawal of pressure fluid, a high pressure zone with an associated first throttle gap and on the opposite side an intermediate pressure zone which is connected to the first throttle gap and is connected to the low pressure zone by way of an associated second throttle gap which changes oppositely to the first throttle gap.

This suggestion is based on the consideration that flat slide valve elements in hydrostatic control devices have apertures on both sides which contain a high pressure and therefore place an axial load on the valve elements. Consequently, they are pressed against the adjacent wall and can be moved only by overcoming frictional force. This is not, in itself, a problem in hydraulic machines because hydraulic forces for bringing about the movement are readily available. However, before the metering motor begins to run, in the control device here in question, one valve element has to be adjusted relatively to the other valve element of the flat slide with a torque applied by way of the control shaft. This torque can be applied by hand but, as soon as the frictional force has been overcome, movement of the valve element is accelerated and then leads to over control. If this valve element carrying the primarily moved slide surface undergoes pressure balancing, frictional forces are substantially avoided. The directional valve is moved out of the neutral position even with a small torque and hence merely by overcoming the force of the neutral position spring. Over control is no longer possible. Such a control device is therefore suitable for faster vehicles because extremely precise steering is available.

In one embodiment, the valve element envelops the metering motor and has openings for the supply and withdrawal of pressure fluid only on one side. By unifying the valve element and metering motor, all control orifices are disposed on one side and separating forces will later also act on the valve element on only one side. Consequently, the intermediate pressure zone on the opposite side suffices to avoid friction.

In another embodiment, the valve element has orifices on both sides for the supply and withdrawal of pressure fluid and provision is made on both sides for a high pressure zone and an intermediate pressure zone each with an associated first and second throttle gap, which are interconnected to form two separate systems. Such conventional valve elements in known control devices can be axially loaded from the one side or the other by reason of the throughgoing apertures. For this reason, two systems are provided each preventing deflection to a respective side. Such double pressure balancing is suitable not only for hydrostatic control devices with metering motors but quite generally for control devices having a flat slide valve of which the valve element having the one slide surface is rotatably mounted between the other slide surface and a wall parallel thereto.

Constructionally, it is advisable for the valve element to have on both sides a respective annular groove as the high pressure zone and an annular groove as the intermediate pressure zone, adjacent to which there is an outlet opening forming an annular rim. The outlet opening adjacent to the respective high pressure zone is connected to the intermediate pressure zone of the other side and the outlet opening adjacent to the intermediate pressure zone is connected to the low pressure side. In this way, sufficient space remains for accommodating the control orifices necessary for the valve function.

It is here of particular interest for the high pressure zone to be formed by an annular groove, the adjacent outlet opening by a contral bore and the intermediate pressure zone and the adjacent outlet opening by outer annular grooves. One thus obtains a comparatively small high pressure zone and a relatively large intermediate pressure zone, as is desired. The central bore takes up little space.

In a further development, it is advantageous for the valve element to have on both sides annular grooves acting as high pressure zones but of different diameter, the intermediate pressure zone on the one side being a central depression and on the other side an annular groove, the passages extending from the outlet openings being substantially parallel. This arrangement may not be symmetrical on both sides but permits better adaptation to the control orifices necessary for the valve function.

It is of particular interest for the axial play of the valve element to be so small that in the neutral position the control orifices of the flat slide on the low pressure side are sealed from the other control orifices even in the absence of pressure in the high pressure and intermediate pressure zones. In practice, a seal will suffice such that the operating motor and/or metering motor lose no liquid to any marked extent. In particular, the axial play can be about 5-50 micrometers, preferably about 10 micrometers. Despite the very small play, which will bring about the seal if necessary, adjustment of the valve element is possible practically without friction.

It is also advisable for the at least one high pressure zone to be connected by way of a respective check valve that opens towards it to the pump connection and each of the two operating motor connections. This ensures that, in special cases, when the pump does not deliver the highest pressure, the respectively highest pressure for the pressure balancing is effective, i.e. pressure balancing is possible even under unfavourable conditions.

Preferred examples of the invention will now be described in more detail with reference to the drawing, wherein.

Figure 1:
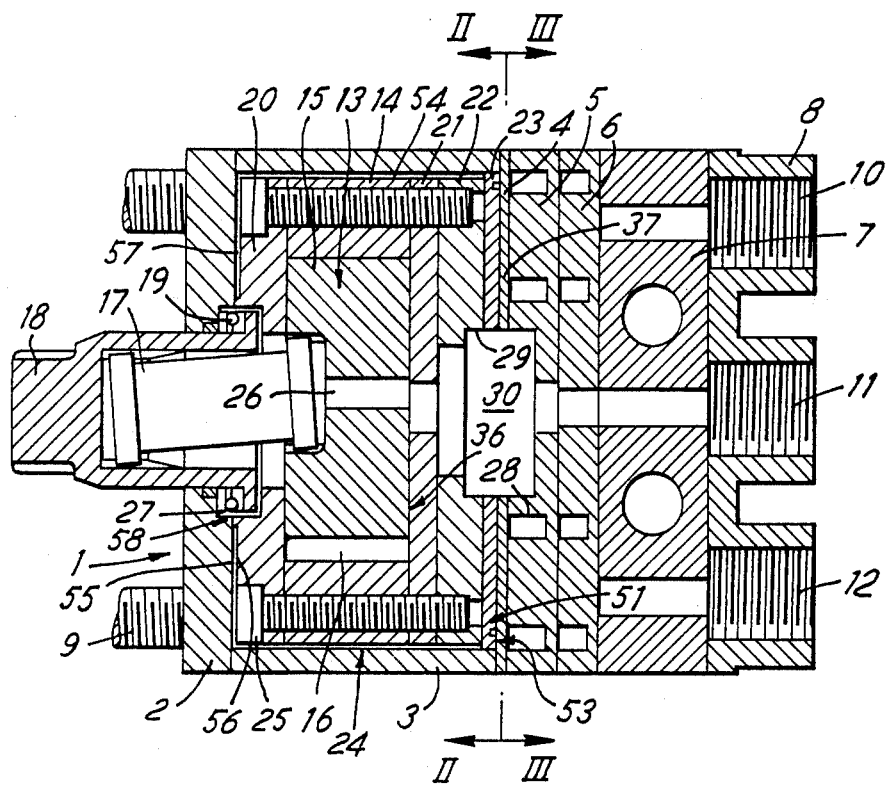
FIG. 1 is a longitudinal section through a first embodiment of the invention.
Figure 2:
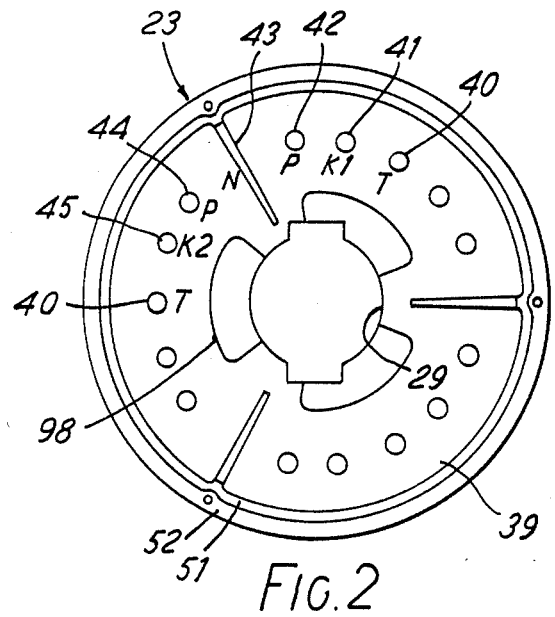
FIG. 2 is a section on the line II—II in FIG. 1.
Figure 3:
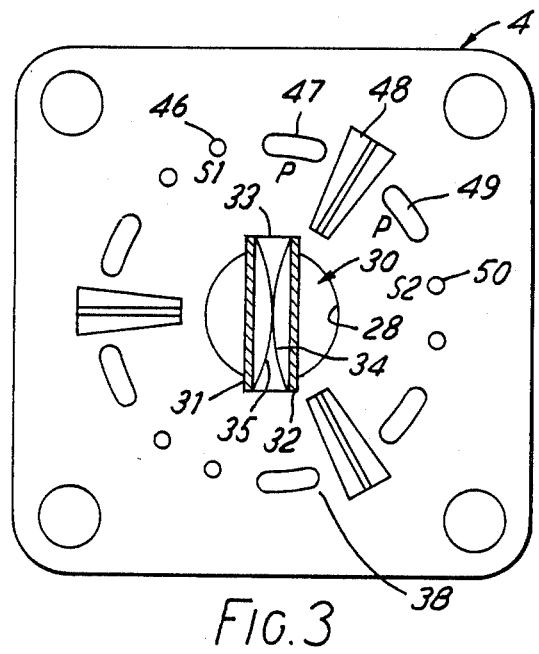
FIG. 3 is a section on the line III—III in FIG. 1.

In the FIGS. 1 to 3 embodiment an outer housing 1 comprises an end wall 2, a sleeve 3, a valve plate 4, a passageplate 5, a passage plate 6 an intermediate plate 7 and a connecting plate 8, held together by tension screws 9. Some of the parts 4 to 7, for example the plates 4, 5 and 6, can be permanently interconnected by soldering, welding or adhesion. The connection plate 8 comprises five connections of which a pump connection 10, a container connection 11 and an operating motor connection 12 are visible. A second operating motor connection and a connection which is selectively connectible to an additional operating circuit or to the container are disposed beyond the plane of the drawing. A metering motor 13 comprises an internally toothed gear ring 14 and an externally toothed gear 15 which define compression chambers 16 between each other. The gear 15 is connected by a cardan shaft 17 to a control shaft 18 which can be provided with a hand control wheel. The control shaft 18 is supported at the outer housing 1 by way of an axial bearing 19. The gear 15 turns and planetates in relation to the gear ring 14. The latter, together with an end wall 20, a distributing valve plate 21, an intermediate plate 22 and a slide valve plate 23, defines a motor housing 24 which is held together by screws 25. Here, again, the plates 21 to 23 may be permanently interconnected. The slide plate 23 covers the screw holes.

The container connection 11 is connected to an opening 27 near the end wall 2 by way of an outlet passage 26 formed by bores in the metering motor 13 and the other parts of the machine. A depression 29 in plates 22 and 23 is also part of the outlet passage. As shown in FIG. 3 an arrangement 30 is inserted in the depression. This arrangement comprises rotation limiting means in the form of two supporting bars 31 and 32 which are pushed into extensions 33 of the depressions corresponding to the corners of a rectangle. Therebetween are neutral position springs 34 and 35 in the form of two curved leaf springs. A distributing valve 36 is formed between the distributing valve plate 21 and the side of the gear 15. A flat slide directional valve 37 is formed between the two plates 23 and 4. Other details of the construction of the control device shown in FIG. 1 will be evident from applicants' co-pending patent application "Hydrostatic control device, particularly steering device" U.S. Appln. Ser. No. 550,319 filed Nov. 10, 1983. This discloses particularly the connection between the connections and the control orifices in the slide surface 38 of valve plate 4 and between the control orifices in the slide surface 39 of valve plate 23 and in the distributing valve 36, as well as the construction thereof.

According to FIG. 2, the slide surface 39 has three circumferentially successive sets of control orifices, namely a container control orifice 40 connected to the container T by way of the outlet passage 26 and the container connection 11, a metering motor control orifice 41 connected to a connection K1 of the metering motor 13, a pump control orifice 42 a neutral position control orifice 43 in the form of a radial slot, and a further pump control orifice 44, which are connected to one another, as well as a metering motor control orifice 45 connected to the connection K2 of the metering motor. This is followed by another container control orifice 40. The slide surface 38 contains an operating motor control orifice 46 connected by way of the one operating motor connection 12 to the connection S1 of the operating motor bringing about the control movement, a pump control orifice 47 connected to the pump P by way of the pump connection 10, a neutral position control orifice 48 in the form of a radial slot which has adjoining throttle depressions and connected by way of a connection (not shown) to the container or a subsequent operating circuit, a further pump control orifice 49 and an operating motor control orifice 50 connected to the operating motor. These control orifices are likewise repeated cyclically.

It will be evident that in the neutral position, the pump connection 10 communicates with the neutral position control orifices 43, 48 by way of the control orifices 47, 42 and 49, 44 i.e. "open centering" operation will take place. The metering motor control orifices 41 and 45 as well as the operating motor control orifices 46 and 50 are closed. If the control shaft 18 is turned clockwise, the gear 15 follows and, since the compression chambers 16 are closed, so does the gear ring 14. Consequently, the slide surface 39 turns relatively to the slide surface 38. The connection by way of the neutral position control orifices 43, 48 is now gradually throttled. The pump control orifice 47 comes into communication with the metering motor control orifice 41 and the metering motor control orifice 45 comes into communication with the operating motor control orifice 50. In addition, the operating motor control orifice 46 comes into registry with the container control orifice 40. Pressure fluid therefore flows over the metering motor to the operating motor and back to the container. The amount compressed in the metering motor corresponds accurately to the angle of rotation of the control shaft so that the operating motor is adjusted precisely proportionally to the control shaft rotation. Converse conditions apply for rotation in the anticlockwise direction.

A high pressure zone 51 is formed by an annular groove in the slide surface 39 of motor housing 24, because this annular groove will be at pump pressure by way of the neutral position control orifices 43. The subsequent marginal zone 52, together with the slide surface 38 of the outer housing 1, forms a first throttle gap 53 which opens into an annular gap 54 between the motor housing 24 and sleeve 3. On the opposite side, an intermediate pressure zone 57 is formed between the end surface 55 of the outer housing 1 and the end surface 56 of motor housing 24, the intermediate pressure zone being bounded at the radially inner circumference by a second throttle gap 58 which leads to the opening 27 of the outlet passage 26. The axial play of the motor housing 24 permitted by the throttle gaps 53 and 58 between the end wall 55 of the outer housing 1 and the slide surface 38 amounts to only 10 micrometer in the present example. This means that, upon pump failure, in the neutral position of the directional valve 37 pressure fluid cannot be pushed from the operating motor nor from the metering motor.

When the pump is in operation, a small leakage flow passes from the high pressure zone 51 through the first throttle gap 52 to the intermediate pressure zone 57 end then over the second throttle gap 58 to the outlet passage. Because of the two throttle gaps, the pressure is divided so that the intermediate pressure in zone 57 assumes a value which opposes the forces exerted on the slide surfaces 39. If the motor housing 24 is moved slightly to the left because of the hydraulic forces obtaining at the control orifices, the intermediate pressure will rise so that the motor housing 24 is displaced from the desired position to a small extent. Upon displacement to the right, the intermediate pressure drops so that again, almost the original position is maintained. Regulation is so accurate that, despite the small axial play, no friction occurs and only the force of the neutral position springs has to be overcome to turn the slide valve, there being no marked friction to overcome.

Figure 4:
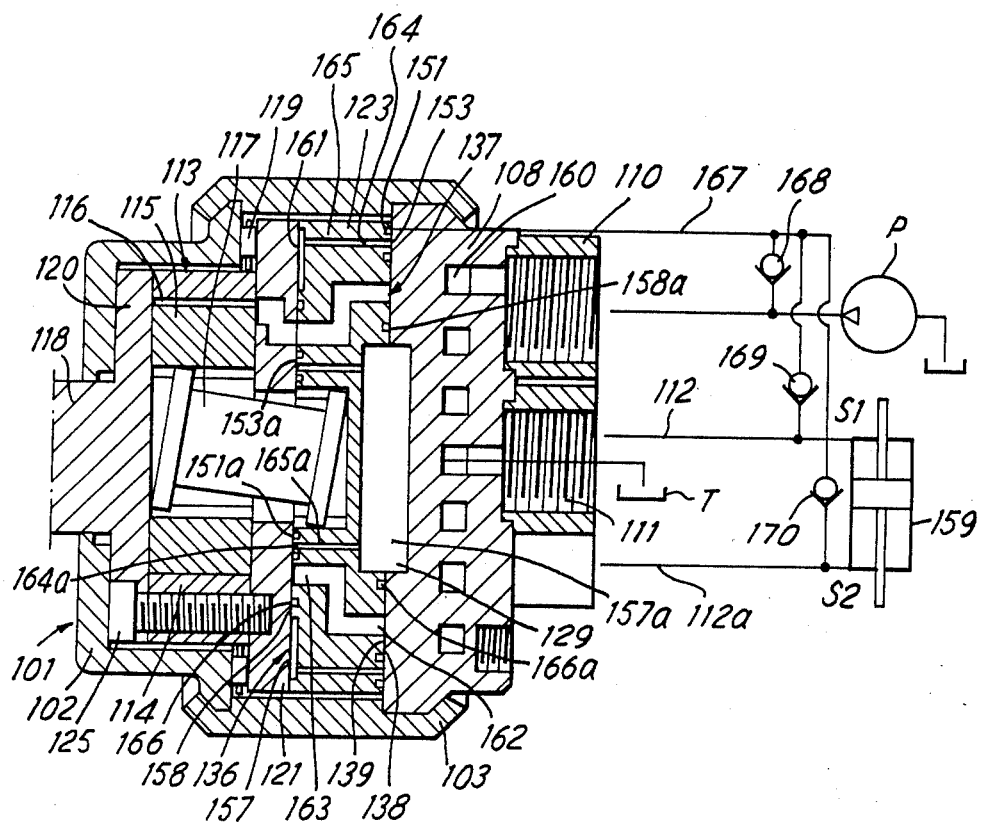
FIG. 4 is a longitudinal section through a second embodiment of the invention.

In the FIG. 4 embodiment, corresponding parts carry reference numerals increased by 100. The outer housing 101 comprises an end member 102, a sleeve memver 103 and a connecting plate 108. These parts are interconnected by beading the ends of the sleeve 103 over. The connecting plate 108 carries several connections on the outside, for example a pump connection 110, leading to a pump P, a container connection 111, leading to the container T, and two operating motor connections 112 and 112a leading to the connections S1 and S2 of an operating motor 159. The inner side forms a slide surface 138 of a flat slide directional valve 137. Different passages 160 in the interior of the connecting member establish communication between the connections and the control orifices in the slide surface 138.

A control shaft 118 is fixed to an end wall 120 of a metering motor 113. The end wall 120 is connected by screws 125 to a gear ring 114 of the metering motor and to a distributing plate 121. These parts turning with the control shaft 118 are supported against a step of the outer housing 101 by way of an axial bearing 119. A gear 115 forming compression chambers 116 together with the gear ring 114 is connected by a cardan shaft 117 to a valve element 123 of which the slide surface 139 together with the slide surface 138 of the directional valve 137 and its opposite slide surface 161 together with the adjoining surface of the distributing plate 121 form a distributing valve 136. In the depression 129, there is an arrangement which comprises the rotation limiting means and the neutral position springs.

On the slide surface 139, the valve element 123 comprises orifices 162 which may contain pressure fluid. Similarly, the opposite side 161 has orifices 163 to which the same applies. A high pressure zone 151 consisting of two annular grooves and outlet openings 164 therebetween are provided in the surface 139 so that first throttle gaps 153 are formed therebetween. Bores 165 parallel to the axis lead to an intermediate pressure zone 157 formed as an annular groove on the opposite side 161, adjoining which there is an outlet opening 166 in the form of an annular groove communicating with the container T. Second throttle gap 158 is therefore formed in the adjacent area. This system is opposite a separate system comprising a high pressure zone 151a in the form of two annular grooves on the side 161 with interposed outlet openings 164a to produce the first throttle gap 153a. Bores 165a parallel to the axis lead to the intermediate pressure zone 157a in the form of a depression. Next to it there is an outlet opening 166a which again communicates with the container T to result in the second throttle gap 138a.

This combination of high pressure and intermediate pressure zones ensures that the valve element 123 will substantially maintain its accurate position irrespective of whether the operating fluid exerts a load to the left or to the right. Displacement of the valve element 123 to the left leads to an increase in the throttle gap 153 in the one system and to a reduction in the throttle gap 158. Consequently, the intermediate pressure rises in zone 157. Simultaneously, there is a reduction in the throttle gap 153a in the other system and an increase in the throttle gap 158a. Consequently, the intermediate pressure rises in the zone 157a. Both effects occur in unison to return the valve element 123 substantially to its neutral position. If, on the other hand the valve element 123 seeks to move to the right, the throttle gaps 153a and 158 are increased and the throttle gaps 153 and 158a are reduced. Consequently, the intermediate pressure in the zone 157a rises whilst that in zone 157 drops. Accordingly, the valve element 123 is returned to the neutral position.

If the control shaft 118 is turned during operation, not only the gear ring 114 is turned with it, but also the gear ring 115 because of the pressure fluid enclosed in the compression chambers 116 and this rotary movement is transmitted to the valve element 123. It is adjusted relatively to the slide surface 138. Since no friction occurs because of the pressure balancing, a comparatively small torque will suffice.

A conduit 167 leading to the high pressure zones is connected by way of a first check valve 168 to the pump connection 110 by way of a second check valve 169 to the operating motor connection 112 and by way of a third check valve 170 to the operating motor connection 112a. If, therefore, the operating motor 159 is loaded by external forces, and a pressure obtains in the one conduit leading to the operating motor that is higher than the pump pressure, this maximum pressure automatically reaches the high pressure zones so that sufficient forces are available for preventing displacement of the valve element 123.

Figure 5:
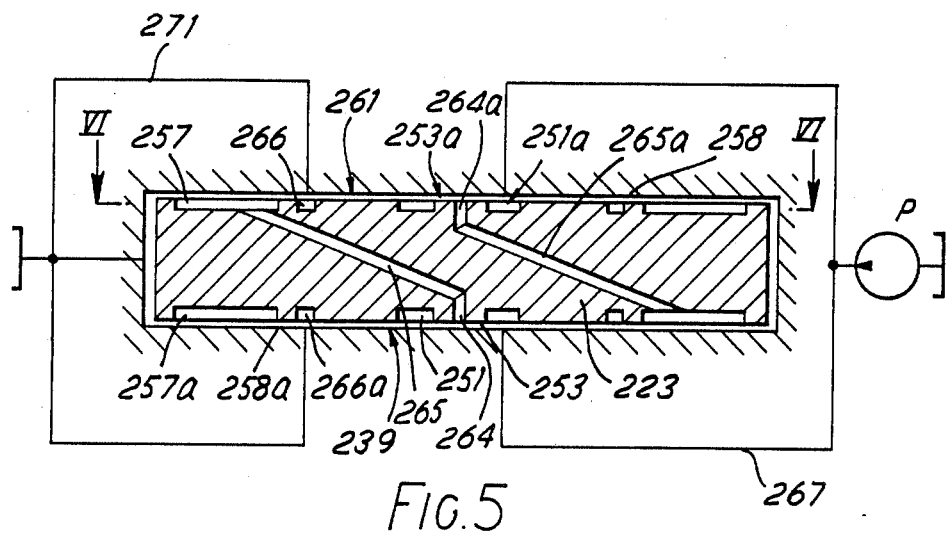
FIG. 5 is a diagrammatic section through a modified valve element.
Figure 6:
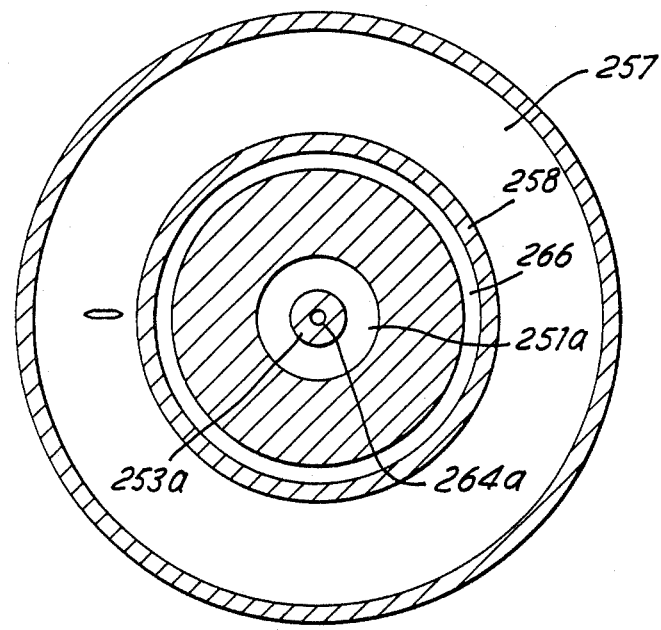
FIG. 6 is a section on the line VI—VI in FIG. 5.

In the FIG. 5 embodiment, corresponding parts carry reference numerals increased by a further 100. Each of both sides 239 and 261 of valve element 223 comprise a high pressure zone 251 and 251a formed by a respective annular groove connected by a conduit 267 to the pump P. Outlet openings in the form of central bores 264 and 264a are connected by way of oblique passages 265 and 165a to intermediate pressure zones 257 and 257a which are disposed on the opposite sides and in the form of annular grooves. Inwardly, thereof, there are annular grooves 266 and 266a connected to the container T by way of a conduit 271. Consequently, each side is formed with first throttle gaps 253 and 253a and second throttle gaps 258 and 258a. Space for the control orifices which are not illustrated is provided between the annular grooves 251 and 266. The function of this valve element is similar to that of the FIG. 4 example.

Numerous modifications are possible. In particular, it is not only the illustrated rotary piston machines that are suitable as metering motor, but also vane-type machines, axial piston machines, radial piston machines and the like. The kinematics of the individual parts may also be different from that illustrated, for example such that both relatively adjustable slide surfaces of the directional valve are rotatably mounted in a housing.

We claim:

1. A hydrostatic steering control device, comprising, a housing having a plurality of ports including fluid inlet and outlet ports and two motor ports connectable to an external servomotor, said housing having first and second transversely and oppositely facing annularly shaped wall means, a metering motor having a casing rotatably mounted in said housing, said casing having first and second wall means with first and second planar surfaces in sealing engagement with said housing first and second surfaces, said metering motor being a gerotor type gear unit with an internally toothed ring member forming a part of said casing between said wall means thereof and an externally toothed star member engaging said ring member, said star member having orbital and rotational movement relative to said ring member to form expansible and collapsible chambers, said housing second wall surface having valving orifices, directional valve means connected to said casing second wall means and being in valving engagement with said housing second wall means, said directional valve means having opposite turn functions formed by valving orifices in said casing second planar surface and said housing second wall means, control shaft means for actuating said star member to rotate said directional valve means upon said shaft means turning said casing and said star member in unison, resilient means for maintaining said directional valve means in a neutral position between two operating positions in the absence of a turning force on said shaft means, passage means cooperable with and connecting said housing ports with said directional valve means, said housing having exhaust passage means between said fluid outlet port and a space radially inward of said housing and casing first wall means, said housing and casing second wall means having first annular groove means therebetween, said housing having inlet passage means between said fluid inlet port and said groove means to create a high pressure zone with said groove means, first throttle gap means between said second housing and casing wall means radially outward from said groove means, and second throttle gap means between said first housing and casing wall means to form an intermediate pressure zone between said first and second throttle gap means.

2. A steering control device according to claim 1 wherein axial movement of said directional valve means causes opposite changes in said first and second throttle gaps.

* * * * *